United States Patent
Jensen

(10) Patent No.: US 12,240,080 B2
(45) Date of Patent: Mar. 4, 2025

(54) WATERJET CUTTING APPARATUS AND RELATED METHODS

(71) Applicant: Aurora Flight Sciences Corporation, Manassas, VA (US)

(72) Inventor: Devin Richard Jensen, Morgantown, WV (US)

(73) Assignee: Aurora Flight Sciences Corporation, Manassas, VA (US)

( * ) Notice: Subject to any disclaimer, the term of this patent is extended or adjusted under 35 U.S.C. 154(b) by 813 days.

(21) Appl. No.: 17/373,216

(22) Filed: Jul. 12, 2021

(65) Prior Publication Data

US 2023/0012360 A1    Jan. 12, 2023

(51) Int. Cl.
*B24C 1/04*    (2006.01)
*B24C 7/00*    (2006.01)
*B26F 3/00*    (2006.01)
*B26D 7/01*    (2006.01)

(52) U.S. Cl.
CPC ............ *B24C 1/045* (2013.01); *B24C 7/0007* (2013.01); *B26F 3/004* (2013.01); *B26F 3/008* (2013.01); *B26D 7/01* (2013.01)

(58) Field of Classification Search
CPC . B26F 3/004; B26F 3/008; B26D 7/01; B24C 1/045; B24C 7/0007
See application file for complete search history.

(56) References Cited

U.S. PATENT DOCUMENTS

| | | | | |
|---|---|---|---|---|
| 4,435,902 A * | 3/1984 | Mercer | ................ | B23Q 9/0064 30/296.1 |
| 4,620,466 A * | 11/1986 | Jumel | ................ | B26F 3/004 83/53 |
| 4,656,791 A * | 4/1987 | Herrington | ................ | B24C 3/04 269/21 |
| 5,782,673 A * | 7/1998 | Warehime | ................ | B24C 5/02 451/36 |
| 10,252,400 B1 * | 4/2019 | Burnham | ................ | B26D 5/00 |
| 2005/0202764 A1 * | 9/2005 | Tateiwa | ................ | B24C 9/00 451/87 |
| 2009/0124178 A1 * | 5/2009 | Ueyama | ................ | B26F 3/008 451/91 |
| 2011/0005361 A1 * | 1/2011 | Hamann | ................ | B24C 1/045 83/177 |
| 2014/0024295 A1 * | 1/2014 | Hashish | ................ | B24C 5/02 451/87 |
| 2015/0118942 A1 * | 4/2015 | Hashish | ................ | B26F 3/008 451/87 |
| 2016/0325402 A1 * | 11/2016 | Mitchell, Jr. | ................ | B24C 3/32 |

(Continued)

OTHER PUBLICATIONS

Hashish, Mohamed, "Trimming of CFRP Aircraft Components," 2013 WJTA-IMCA Conference and Expo, Sep. 9-11, 2013, Houston, Texas, 14 pages.

(Continued)

*Primary Examiner* — Omar Flores Sanchez
(74) *Attorney, Agent, or Firm* — Hanley, Flight & Zimmerman, LLC

(57) ABSTRACT

Waterjet cutting apparatus and related methods are disclosed herein. An example apparatus includes a tank defining a volume to contain a fluid therein, a fixture extending from the tank, and a tube extending from the tank, the tube to isolate the fixture and a part supported by the fixture from turbulence of the fluid disposed in the tank.

20 Claims, 9 Drawing Sheets

(56) References Cited

U.S. PATENT DOCUMENTS

| | | | | |
|---|---|---|---|---|
| 2017/0106480 A1* | 4/2017 | Keeton | .............. | B23K 37/0408 |
| 2017/0151686 A1* | 6/2017 | Sunter | ................ | A22C 17/0086 |
| 2018/0056465 A1* | 3/2018 | Koshiishi | .......... | B23Q 11/1076 |
| 2024/0021901 A1* | 1/2024 | Uchida | ............... | H01M 50/543 |
| 2024/0051287 A1* | 2/2024 | Lee | ......................... | B08B 11/04 |
| 2024/0181669 A1* | 6/2024 | Edarp | .................... | B26F 3/004 |

OTHER PUBLICATIONS

Olsen, John H., "Fixturing for Abrasive Jet Machining," The Fabricator, Jan. 10, 2006, https://www.thefabricator.com/thefabricator/article/waterjetcutting/fixturing-for-abrasive-jet-machining, 7 pages.

Cutting Tool Engineering, "Know How to Hold 'em," published Mar. 1, 2011, https://www.ctemag.com/news/articles/know-how-hold-em#, 5 pages.

Uhlmann, E., et al., "Machining of Carbon and Glass Fibre Reinforced Composites," ScienceDirect, 7th HPC 2016—CIRP Conference on High Performance Cutting, 2016, pp. 63-66, 4 pages.

* cited by examiner

WATERJET CUTTING APPARATUS AND RELATED METHODS

FIELD OF THE DISCLOSURE

This disclosure relates generally to waterjets and, more particularly, to waterjet cutting apparatus and related methods.

BACKGROUND

A waterjet uses a high pressure, high velocity jet or stream of fluid (e.g., water) to cut materials such as metal flat stock during fabrication of parts. In some instances, the fluid is mixed with an abrasive material. A material to be cut may be supported by a tank or other structure that collects the fluid and/or abrasive waste material during operation of the waterjet. In other instances, a capture cup carried by the waterjet may collect fluid and debris during movement of the waterjet.

Figure 1:
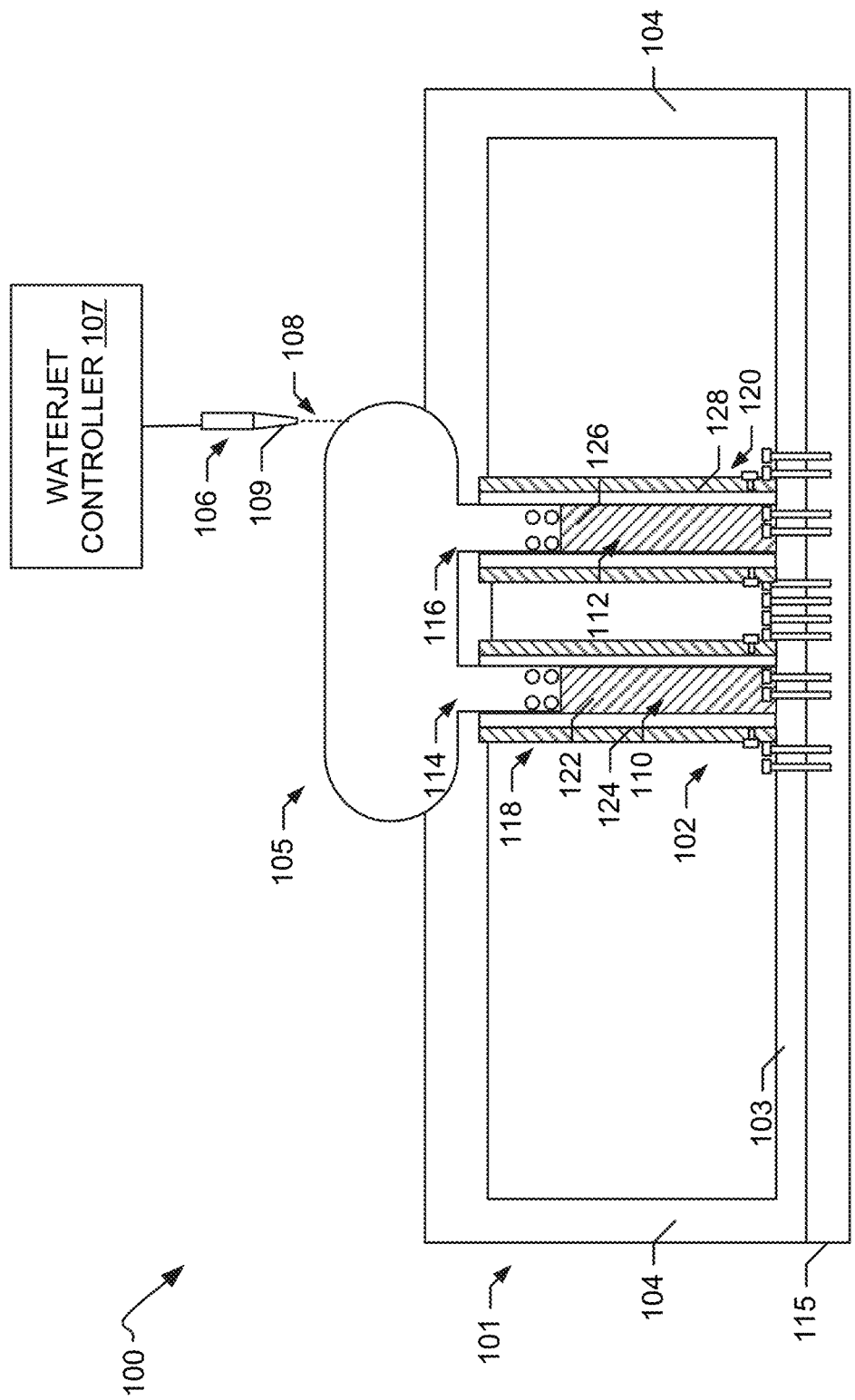
FIG. 1 illustrates a system including an example tank and an example mounting structure for supporting a workpiece during a waterjet cutting process in accordance with examples of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections.

SUMMARY

An example apparatus includes a tank defining a volume to contain a fluid therein, a fixture extending from the tank, and a tube extending from the tank, the tube to isolate the fixture and a part supported by the fixture from turbulence of the fluid disposed in the tank.

An example system includes a tank to receive a fluid; a first member to support a part during a waterjet cutting process, the first member coupled to a surface of the tank; and a second member to isolate the first member and the part from fluid turbulence during the waterjet cutting process. The second member is disposed in the tank. The part and at least a portion of the first member disposed beyond the second member.

An example method includes positioning, via a controller, a nozzle of a waterjet cutter relative to a part, the part supported by a fixture coupled to a surface of a tank, at least a portion of the fixture surrounded by an isolation tube; and causing, via the controller, the nozzle to move relative to the part to cause at least a portion of the part to be cut, the isolation tube to reduce vibrations of the tank transferred to the fixture and the part during the cutting of the part.

Another example apparatus includes a first fixture disposed in a tank, the first fixture to support a workpiece and a first isolation member disposed in the tank. The first isolation member surrounds the first fixture and is spaced apart from the first fixture. The first isolation member is to isolate the first fixture from fluid in the tank.

DETAILED DESCRIPTION

A waterjet uses a high pressure, high velocity jet or stream of fluid (e.g., water) to cut materials such as metal flat stock during fabrication of parts. In some instances, the fluid is mixed with an abrasive material. A material to be cut may be supported by a tank or other structure that collects the fluid and/or abrasive waste material during operation of the waterjet. In other instances, a cup associated with the waterjet may capture water and debris during movement of the waterjet. The cup may be carried by an arm that travels with the waterjet.

When a part or workpiece to be cut requires tight tolerances, a fixture may be used to support the workpiece. Such fixtures are typically coupled to an external surface of the tank that collects the fluid. As such, the workpiece should include a sufficient amount of material that extends beyond the portion to be cut to be enable the workpiece to be coupled to the fixture. In such arrangements, the part remains at least partially attached to the flat stock from which it was cut until the cut has been completed and the part can be separated from the remaining flat stock.

Waterjets that include capture cups can also present limitations with respect to cutting. In some instances, a size of a cutting end effector of the waterjet tool including a capture cup can restrict portions of the part that can be cut. Thus, such waterjets may primarily be used for trimming operations near edges of the part. Additionally, waterjets that include capture cups are often customized, expensive tools.

Composite parts, such as those used in fabrication of an aircraft, can be formed via a layup process that may result in rough or imprecise edges after curing. The composite part may be trimmed to obtain a clean edge. However, known milling techniques can result in fiber pullout, delamination, and fiber breakage.

A waterjet can be used to trim a composite part. However, some part geometries and/or cutting paths to achieve the cut geometry do not permit the part to be held via fixtures coupled to an exterior of a tank. Further, portions of the part to be cut may not be reachable with a cutter that includes a capture cup. In such instances, the part may be mounted to an internal structure or support disposed in the tank (i.e., rather than to a support that is coupled to an external surface of the tank). However, mounting the part to an internal structure in the tank can introduce instabilities into the part and cause inaccuracies during the cutting process. For instance, the part may be mounted to the internal structure when the tank is empty. However, the tank may deform as the tank is filled with fluid. The deformation of the tank affects the internal structure supporting the part and, thus, the fixturing of the part. Further, when the waterjet enters the fluid in the tank after exiting the part during cutting, turbulent conditions are created in the fluid, which can cause the internal structure to which the part is coupled to vibrate as the waterjet follows the cut path for the part. Vibrations of the internal structure can affect the stability of the mounted part and the accuracy of the cut(s) by the waterjet cutter.

Disclosed herein are example structures for supporting a part to be cut via a waterjet. Example mounting structures disclosed herein isolate or substantially isolate the part from effects of the deformable tank when the tank is filled with fluid as well as from effects of turbulent fluid. As a result, example mounting structures disclosed herein prevent or substantially reduce the transfer of vibrations due to fluid turbulence as the waterjet moves through a cut path for the part. As result of the reduction in vibrations experienced by the part when supported by the example disclosed mounting structures, the accuracy of the cut geometries can be maintained or improved.

Example mounting structures disclosed herein include fixtures that are to be coupled to a tank that includes openings or apertures defined in a surface of the tank (e.g., a bottom surface of the tank). The fixtures serve as supports for the workpiece to be cut. In examples disclosed herein, each of the fixtures is surrounded by an isolation member (e.g., a tube), where the isolation member is spaced apart from the fixture. In examples disclosed herein, the isolation members isolate the fixtures and, thus, the workpiece supported by the fixtures, from the effects of fluid turbulence and/or deformation of the tank during the waterjet cutting process.

FIG. 1 illustrates an example system 100 including a tank 101 including an example mounting structure 102 for supporting a workpiece 105 during cutting by a waterjet cutter 106 in accordance with teachings disclosed herein. A position of the waterjet cutter 106 relative to the workpiece 105 and operation of the waterjet cutter 106 to cut the workpiece 105 is controlled by a waterjet controller 107 (e.g., hardware and/or software). The waterjet cutter 106 includes a nozzle 109 to emit a high pressure/high fluid 108 (e.g., water, water mixed with an abrasive material). The tank 101 collects the fluid 108 emitted by the waterjet cutter 106 during operation. The tank 101 can also contain fluid to mitigate noise generated during the waterjet cutting process and to collect waste material. The tank 101 includes a first or bottom surface 103 and sidewalls 104 surrounding the first surface 103 to define a volume of the tank 101.

The example mounting structure 102 of FIG. 1 includes one or more fixtures (e.g., pillars) that provides means for supporting the workpiece 105 during waterjet cutting. In the example of FIG. 1, a first member or fixture 110 and a second member or fixture 112 are shown. The example mounting structure 102 can include fewer fixtures or more fixtures than shown in FIG. 1 (e.g., one fixture, four fixtures). As disclosed herein, the example fixtures 110, 112 are removably coupled to a surface 115 (e.g., a floor) on which the tank 101 rests via mechanical fastener(s) that extend through the first surface 103 of the tank 101.

As shown in FIG. 1, a first portion 114 of the workpiece 105 is supported by the first fixture 110 and a second portion 116 of the workpiece 105 is supported by the second fixture 112. The portions 114, 116 can be removably coupled to (e.g., via fasteners) to the fixtures 110, 112 to secure the workpiece 105 during cutting.

The example mounting structure 102 of FIG. 1 includes means for isolating the fixtures 110, 112 from fluid turbulence in the tank during waterjet cutting. The example mounting structure 102 includes a first isolation member or tube 118 that surrounds the first fixture 110 and a second isolation member or tube 120 that surrounds the second fixture 112. The isolation tubes 118, 120 may be cylindrical, rectangular, and/or have other shapes to enable the isolation tubes 118, 120 to surround the fixtures 110, 112. In some examples, each of the tubes 118, 120 is formed from one piece of material that is extruded to define an opening to receive the fixtures 110, 112. In other examples, each of the tubes 118, 120 is formed from two or more pieces that are coupled together to define an area to receive the respective fixtures 110, 112. As disclosed herein, the example tubes 118, 120 are removably coupled to the surface 115 (e.g., a floor) on which the tank 101 rests via mechanical fastener(s) that extend through the first surface 103 of the tank 101.

In the example of FIG. 1, the first isolation tube 118 is spaced apart from the first fixture 110 such that a volume of air is disposed in a gap defined between exterior surface(s) 122 of the first fixture 110 and interior surface(s) 124 of the first isolation tube 118 (i.e., surface(s) of the first tube isolation 118 that face the first fixture 110). The second tube 120 is spaced apart from the second fixture 112 such that a volume of air is disposed in a gap defined between exterior surface(s) 126 of the second fixture 112 and interior surface(s) 128 of the second tube 120. Thus, regions between the tubes 118, 120 and the fixtures 110, 112 define fluid-free or substantially fluid-free volumes within the tank 101. As such, forces exerted on the tubes 118, 120 due to fluid turbulence in tank 101 during waterjet cutting are prevented or substantially prevented from being transferred to the fixtures 110, 112. Thus, the tubes 118, 120 serve to isolate the fixtures 110, 112 and the workpiece 105 supported by the fixtures 110, 112 from the turbulent effects of the fluid in the tank 101.

Figure 2:
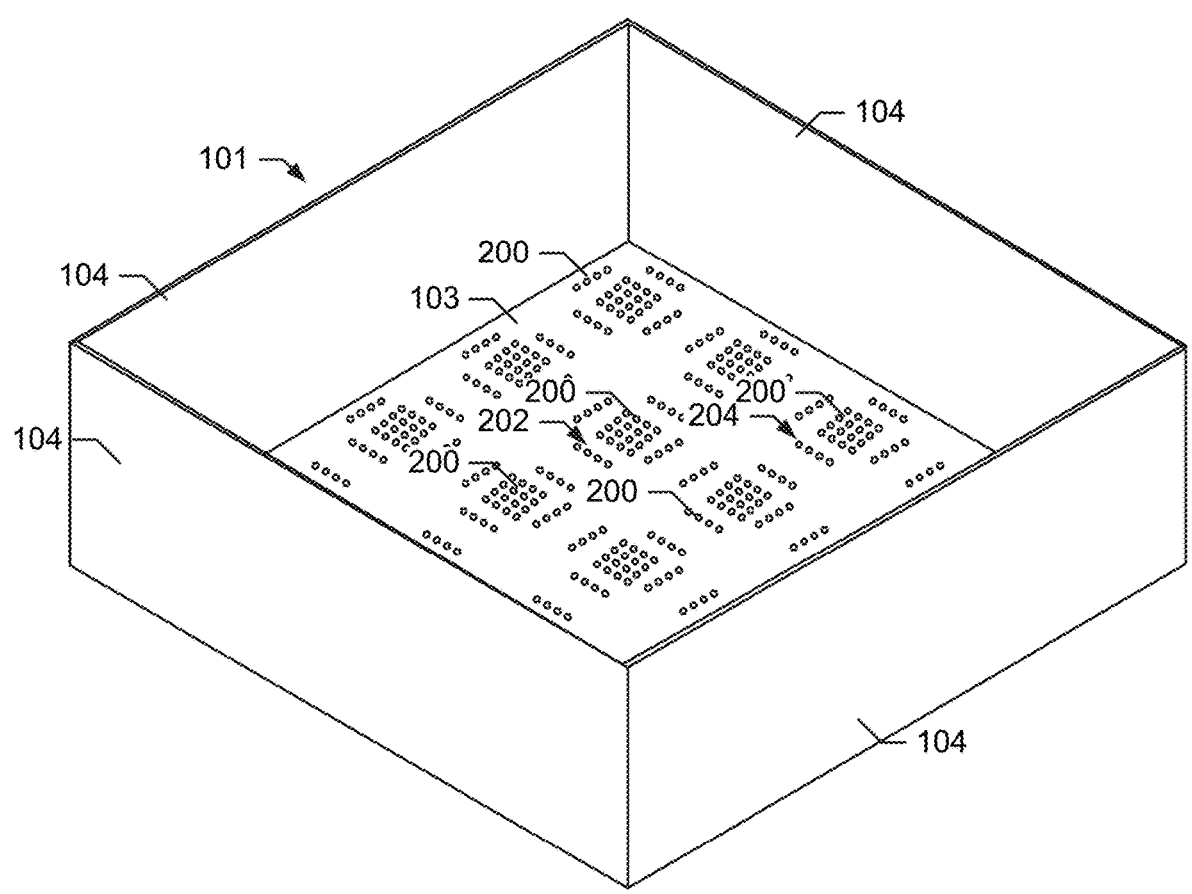
FIG. 2 illustrates the example tank of FIG. 1.

FIG. 2 illustrates the example tank 101 of FIG. 1 including the first surface 103 and the sidewalls 104. The first surface 103 of the tank 101 defines a plurality of apertures 200 therein. As illustrated in FIG. 2, the apertures 200 are arranged or grouped in sets or patterns that provide for selective mounting of the components of the example mounting structure 102 of FIG. 1 (e.g., the fixtures 110, 112, the tubes 118, 120) at different locations relative to the first surface 103 of the tank 101. For example, first ones of the apertures 200 can define a first pattern 202 and second ones of the apertures 200 can define a second pattern 204 at a different location on the first surface 103 of the tank 101 than the first pattern 202. The apertures 200 can be arranged in patterns having different shapes and/or sizes than shown in FIG. 2. The aperture patterns can be located at different locations on the first surface 103 of the tank 101 than shown in FIG. 2. Also, the number of apertures 200 formed in the first surface 103 of the tank 101 can differ from the example shown in FIG. 2.

In the example of FIG. 2, the apertures 200 extend through the first surface 103 of the tank 101 to enable the components of the mounting structure 102 to be coupled directly to the surface 115 (FIG. 1) on which the tank 101 rests. As a result of the direct mounting of the fixtures 110, 112 (FIG. 1) of the mounting structure 102 to the surface 115 (e.g., a floor) on which the tank 101 rests, the fixtures 110, 112 are isolated or substantially isolated from effects of deformation of the tank 101 as the tank 101 fills with fluid.

Figure 3:
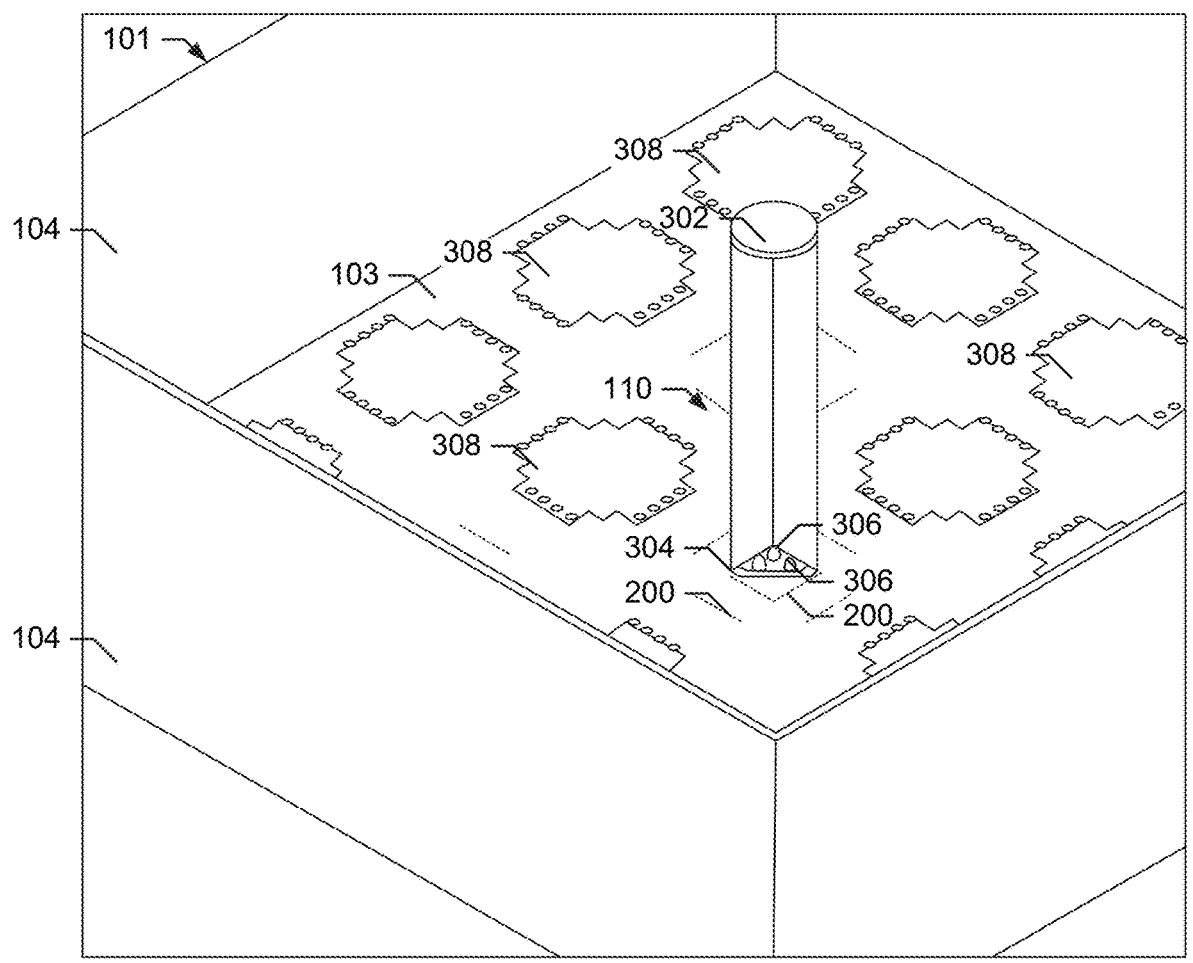
FIG. 3 illustrates a fixture of the example mounting structure of FIG. 1.

FIG. 3 illustrates the first fixture 110 of the example mounting structure 102 of FIG. 1 coupled to the first surface 103 of the tank 101. For example purposes, the first fixture 110 will be discussed herein with the understanding that the second fixture 112 and/or other fixtures disposed in the tank 101 are substantially the same as the first fixture 110.

The first fixture 110 can be made of, for instance, a non-corrosive material. In some examples, the first fixture 110 is formed from one piece of material. In other examples, the first fixture 110 is formed from two or more pieces that are coupled together.

The first fixture 110 includes a first end 302 and a second end 304 opposite the first end 302. As shown in FIG. 3, the second end 304 is coupled to the tank 101 and, thus, the surface 115 (FIG. 1) on which the tank 101 rests, via fasteners 306 (e.g., screws) extending through a first set of the apertures 200 defined in the first surface 103 of the tank 101. The first set of the apertures 200 that receives the fasteners 306 is part of one of the patterns or groups of the apertures 200 (e.g., the patterns 202, 204 of FIG. 2) that provide for mounting of the components of the mounting structure 102 (FIG. 1) at selective locations in the tank 101. In some examples, the first fixture 110 has a height such that the first end 302 of the first fixture 110 extends above the sidewalls 104 of the tank 101. In use, the first end 302 of the first fixture 110 supports the workpiece 105 or a portion thereof that is to undergo waterjet cutting.

As disclosed herein, the first surface 103 of the tank 101 includes the plurality of apertures 200, not all of which may be used for fastening the fixtures and/or other components of the mounting structure 102 of FIG. 1. In examples disclosed herein, respective portions of the first surface 103 including the apertures 200 that are not used for fastening the components of the mounting structure 102 to the tank 101 are covered with a seal 308. The seal 308 can include, for instance, a plate. The example seal(s) 308 of FIG. 3 have a width that enables the seal(s) 308 to cover multiple ones of the apertures 200 (e.g., some or all of the apertures defining a particular group or pattern of the apertures 200 formed in the first surface 103). The seal(s) 308 can be removably coupled to the first surface 103 of the tank 101 via mechanical fasteners. Thus, the tank 101 provides for a modular configuration of the mounting structure 102, as portions of the first surface 103 including the apertures 200 can be selectively sealed or used to support the component(s) of the mounting structure 102 based on the location of the mounting structure 102 in the tank 101.

Figure 4:
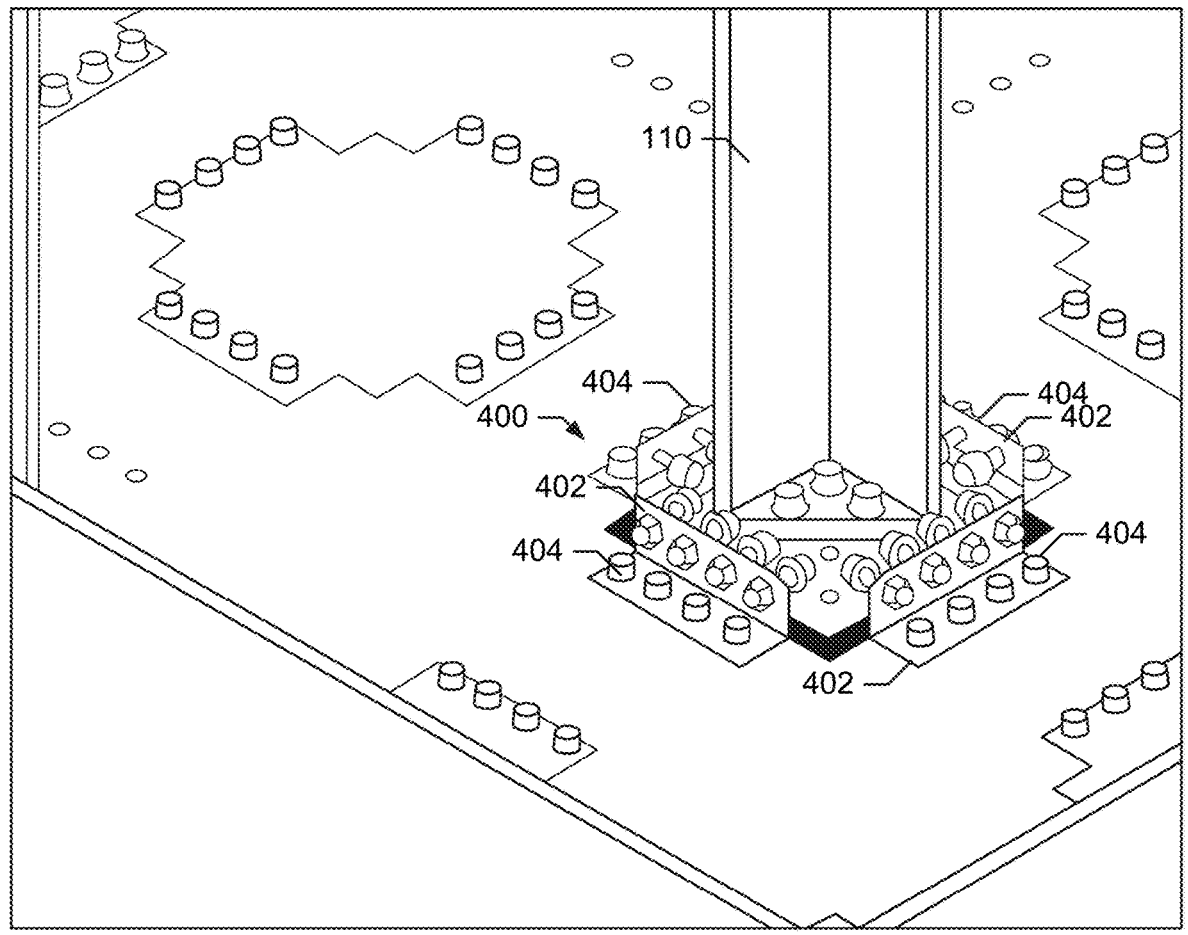
FIG. 4 illustrates example fastening hardware for the mounting structure of FIG. 1.

FIG. 4 illustrates example mounting hardware 400 that is used to support an isolation member (e.g., the isolation tubes 118, 120 of FIG. 1) that surrounds the first fixture 110 in the tank 101. As disclosed herein, the isolation member provides means for isolating the first fixture 110 from vibrations to which the first fixture 110 would otherwise be subject to due to turbulence of fluid in the tank 101. The mounting hardware 400 includes bracket(s) 402 that are coupled to the first surface 103 of the tank 101 via fasteners 404 that extend through the apertures 200 (FIG. 2) defined in the first surface 103. The mounting hardware 400 is installed at locations in the tank 101 corresponding to the location where the first fixture 110 is mounted. For instance, the mounting hardware is fastened to ones of the apertures 200 that are part of the same group or pattern of apertures that are used to secure the first fixture 110. The size, shape, and/or number of the brackets 402 to support each isolation tube can differ from the example shown in FIG. 4. The properties of the bracket(s) 402 can be based on the size and/or shape of the isolation tube that the bracket(s) 402 support.

Figure 5:
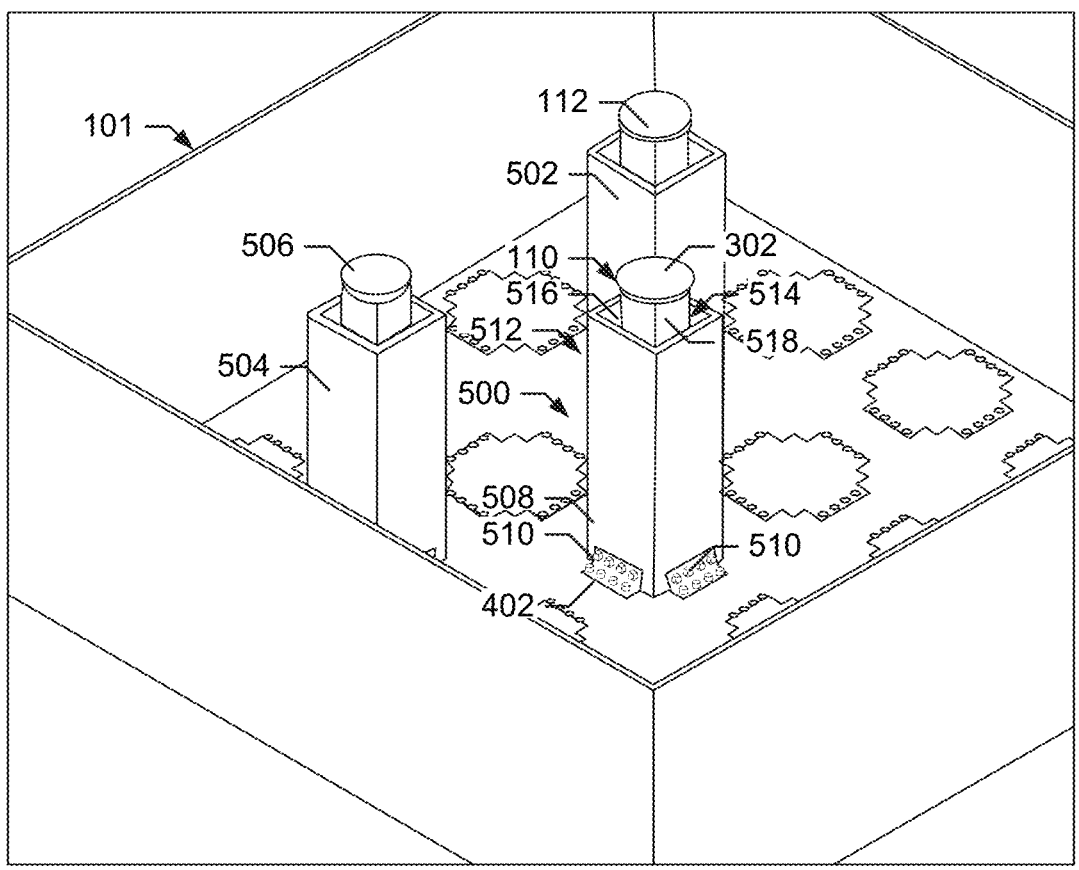
FIG. 5 illustrates isolation members of the example mounting structure of FIG. 1.

FIG. 5 illustrates example isolation tubes of the mounting structure fixtures in the tank 101. In particular, FIG. 5 shows a first isolation tube 500 surrounding the first fixture 110, a second isolation tube 502 surrounding the second fixture 112, and a third isolation tube 504 surrounding a third fixture 506. For example purposes, the first isolation tube 500 will be discussed with the understanding that the second isolation tube 502 and the third isolation tube 504 are substantially the same.

A first end 508 of the first isolation tube 500 is coupled to the bracket(s) 402 via fasteners 510. Thus, the bracket(s) 402 provide means for supporting the first isolation tube 500 in the tank 101. A second end 512 of the first isolation tube 500 is open to enable the first end 302 of the first fixture 110 to extend above the isolation tube 500 to support a workpiece (e.g., the workpiece 105 of FIG. 1). As shown in FIG. 5, the first isolation tube 500 is spaced apart from the first fixture 110 such that there is a gap 514 defined between an inner surface 516 of the first isolation tube 500 and an exterior surface 518 of the first fixture 110 opposite the inner surface 516 (e.g., the gap is defined between a first inner surface or face 516 of the first isolation tube 500 and a first exterior surface or face 518 of the first fixture 110 closest to (e.g., directly opposite) the first inner surface 516). The gap 514 may have a width of, for example, at least 0.25 inches. As such, a volume of air enters the gap 514 between the first isolation tube 500 and the first fixture 110. Thus, the first isolation tube 500 is isolated from vibrations experienced by the first isolation tube 500 due to, for instance, fluid turbulence when the tank 101 is filled with fluid and cutting is in progress.

As shown in FIG. 5, the example first isolation tube 500 has a height that is less than a height of the first fixture 110. Thus, the first isolation tube 500 does not interfere with a workpiece supported by the first fixture 110 and/or a waterjet cutting tool. Although the example first isolation tube 500 of FIG. 5 has a substantially rectangular shape, the first isolation tube 500 can have other shapes (e.g., a cylindrical shape).

The first isolation tube 500 can be made of, for instance, a non-corrosive material. The first isolation tube 500 can be formed as a single piece (e.g., to prevent leakage points). In other examples, the first isolation tube 500 can be formed as two or more pieces that are mechanically or chemically fastened together (before or during insertion of the first isolation tube 500 in the tank 101). In examples in which the first isolation tube is a single piece (or is formed from two or more pieces prior to installation), the first isolation tube 500 can be slid over the first fixture 110 during installation.

Figure 6:
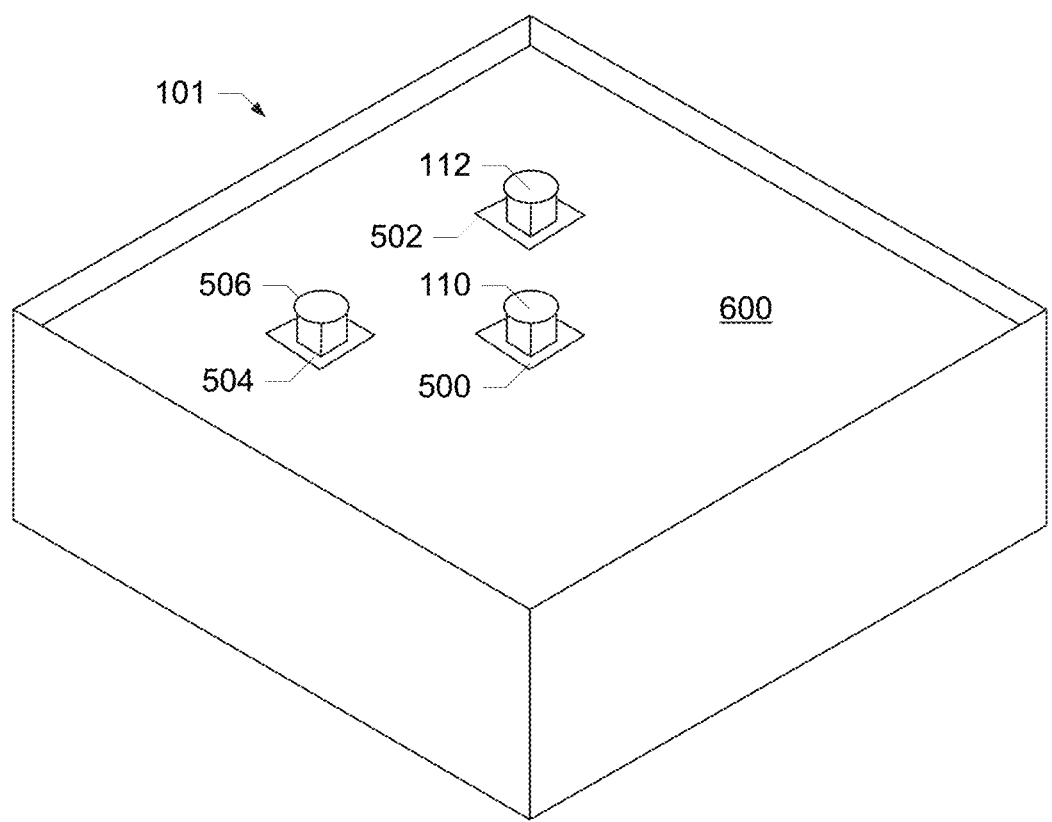
FIG. 6 illustrates the example tank including fluid contained therein and the example mounting structure of FIGS. 1-5.

FIG. 6 shows the example tank 101 including the fixtures 110, 112, 506 and the corresponding isolation tubes 500, 502, 504 associated with each fixture 110, 112, 506. In the example of FIG. 6, the tank 101 is filled with a fluid (e.g., water) 600 in preparation for, for example, a waterjet cutting process. As shown in FIG. 6, the fixtures 110, 112, 506 extend above the fluid 600 such that a workpiece supported by the fixture(s) 110, 112, 506 is also above the fluid 600. As also shown in FIG. 6, a portion of each isolation tube 500, 502, 504 (e.g., the second end 512 of the first isolation tube 500) extends above the fluid 600. Thus, the isolation tubes 500, 502, 504 isolate the fixtures 110, 112, 506 from the fluid 600.

Although the isolation tubes 500, 502, 504 serve to separate the fixtures 110, 112, 506 from the fluid 600 in the tank 101, some amount of the fluid 600 and/or fluid emitted by the waterjet (e.g., the fluid 108 emitted by the water jet 106 of FIG. 1) may enter the gap 514 between the isolation tubes 500, 502, 504 and the fixtures 110, 112, 506 during the waterjet cutting process. Small amounts of fluid are not likely to affect the stability of the fixtures 110, 112, 506 as compared to if the fixtures were exposed to effects of the fluid 600 in the tank 101 without the isolation tubes 500, 502, 504. However, in some examples, the first surface 113 (FIG. 1) of the tank 101 may include one or more drains formed therein (e.g., at location(s) corresponding to the location(s) of the apertures 200 (FIG. 2) to which the fixtures are coupled). For instance, a drain can be defined in the first surface 113 of the tank 101 relative to a pattern 202, 204 of apertures 200 such that the drain would be surrounded by an isolation tube when the isolation tube is installed in the tank 101. The drain can couple with a drainage system external to the tank 101 to remove excess fluid from the gap 514 between the isolation tubes 500, 502, 504 and the fixtures 110, 112, 506. In some instances, the drainage system may include a pump to actively remove the excess water. The drain(s) can be covered by the seal(s) 308 (FIG. 3) when not associated with a fixture installed in the tank 101.

Figure 7:
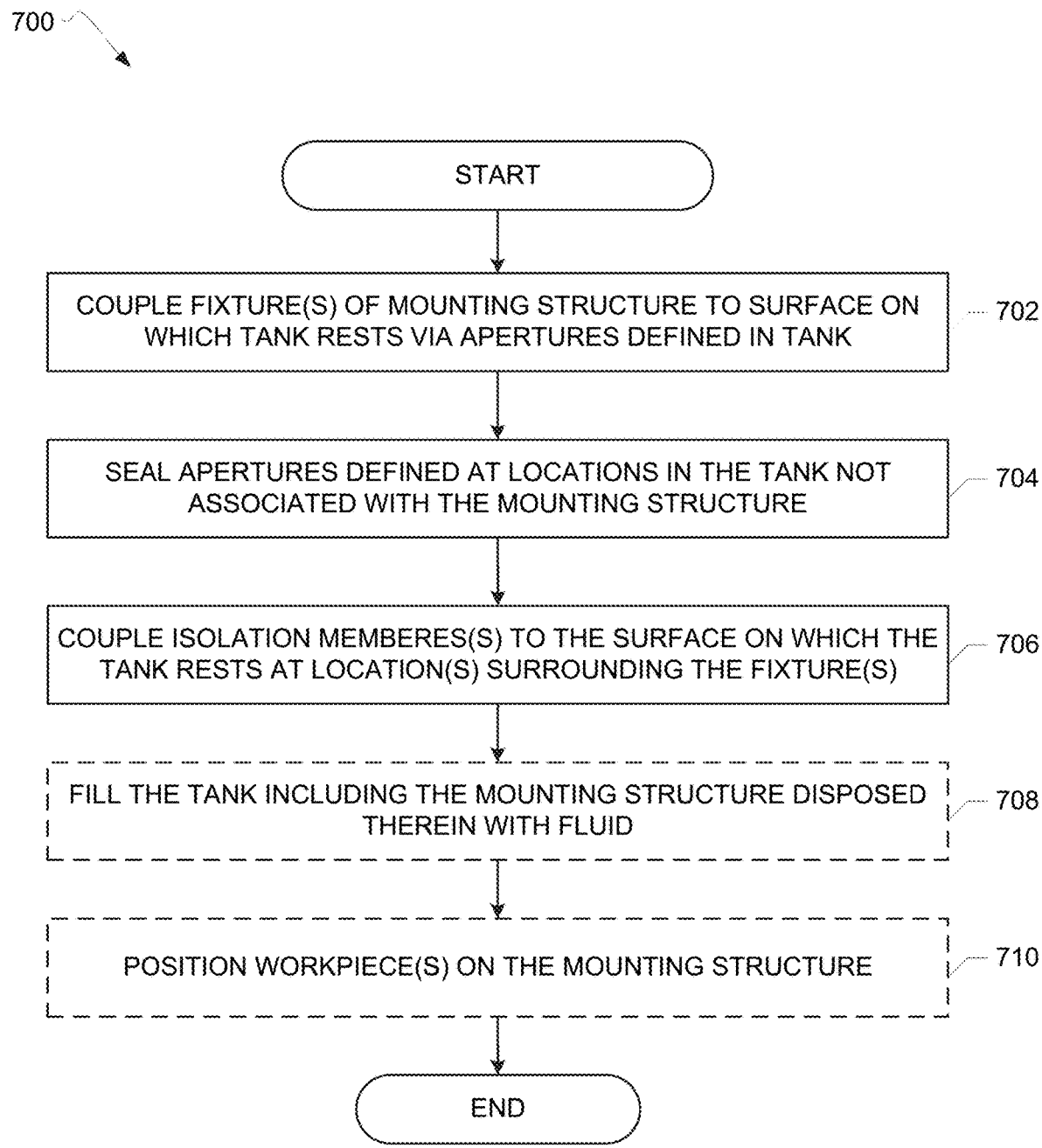
FIG. 7 is a flowchart of an example method to assemble a mounting structure in accordance with teachings of this disclosure.

FIG. 7 is an example method 700 for assembling a mounting structure (e.g., the example mounting structure 102 of FIGS. 1-6) in a tank (e.g., the tank 101 of FIGS. 1-6) to support a workpiece during a process such as waterjet cutting. The example method 700 begins with coupling fixture(s) of the mounting structure to a surface on which the tank rests (block 702). For example, the fixtures 110, 112, 506 can be coupled to the surface 115 (e.g., floor) on which the tank 101 rests via the fasteners 306 extending through apertures 200 formed in the first surface 113 of the tank 101.

As disclosed herein, the tank can include patterns of apertures defined various locations therein to enable selective positioning of the fixtures of the mounting structure in the tank. The example method 700 includes sealing the apertures that do not receive components of the mounting structure (block 704). For example, seal(s) 308 (e.g., plates) can be coupled to the tank 101 to cover the aperture(s) 200 and/or patterns 202, 204 of apertures that will not receive components of the mounting structure 102.

The example method 700 includes coupling isolation member(s) to the surface on which the tank rests at location(s) that surround the fixture(s) (block 706). For example, the bracket(s) 402 of FIG. 4 can be coupled to the surface 115 that supports the tank 101 via the fasteners 404. The isolation member(s) 500, 502, 504 are coupled to the bracket(s) 402 via the fasteners 510 such that each fixture 110, 112, 506 is surrounded by, but spaced apart from, an isolation member 500, 502, 504. In some examples, the isolation member 500, 502, 504 is slid over the corresponding fixture 110, 112, 506 to install the isolation member 500, 502, 504 about the fixture 110, 112, 506. In other examples, two or more pieces of the isolation member 500, 502, 504 may be assembled around the fixture 110, 112, 506.

The example method 700 of FIG. 7 can optionally include filling the tank with the mounting structure disposed therein with fluid (e.g., water) (block 708). As disclosed herein, the fixtures 110, 112, 506 have a height to enable a portion of the fixture 110, 112, 506 extending from the tank 101 to be disposed above the fluid in the tank 101.

The example method 700 can optionally include positioning workpiece(s) on the mounting structure (block 710). For example, the workpiece 105 of FIG. 5 can be supported by (e.g., coupled to) the first end(s) 302 of the fixture(s) 110, 112, 506.

Although the example method 700 is described with reference to the flowchart illustrated in FIG. 7, many other methods of assembling the example mounting structure 102 of FIGS. 1-6 may alternatively be used. For example, the order of execution of the blocks may be changed, and/or some of the blocks described may be changed, eliminated, or combined. Similarly, additional operations may be included in the example method of FIG. 7 before, in between, or after the blocks shown in FIG. 7.

Figure 8:
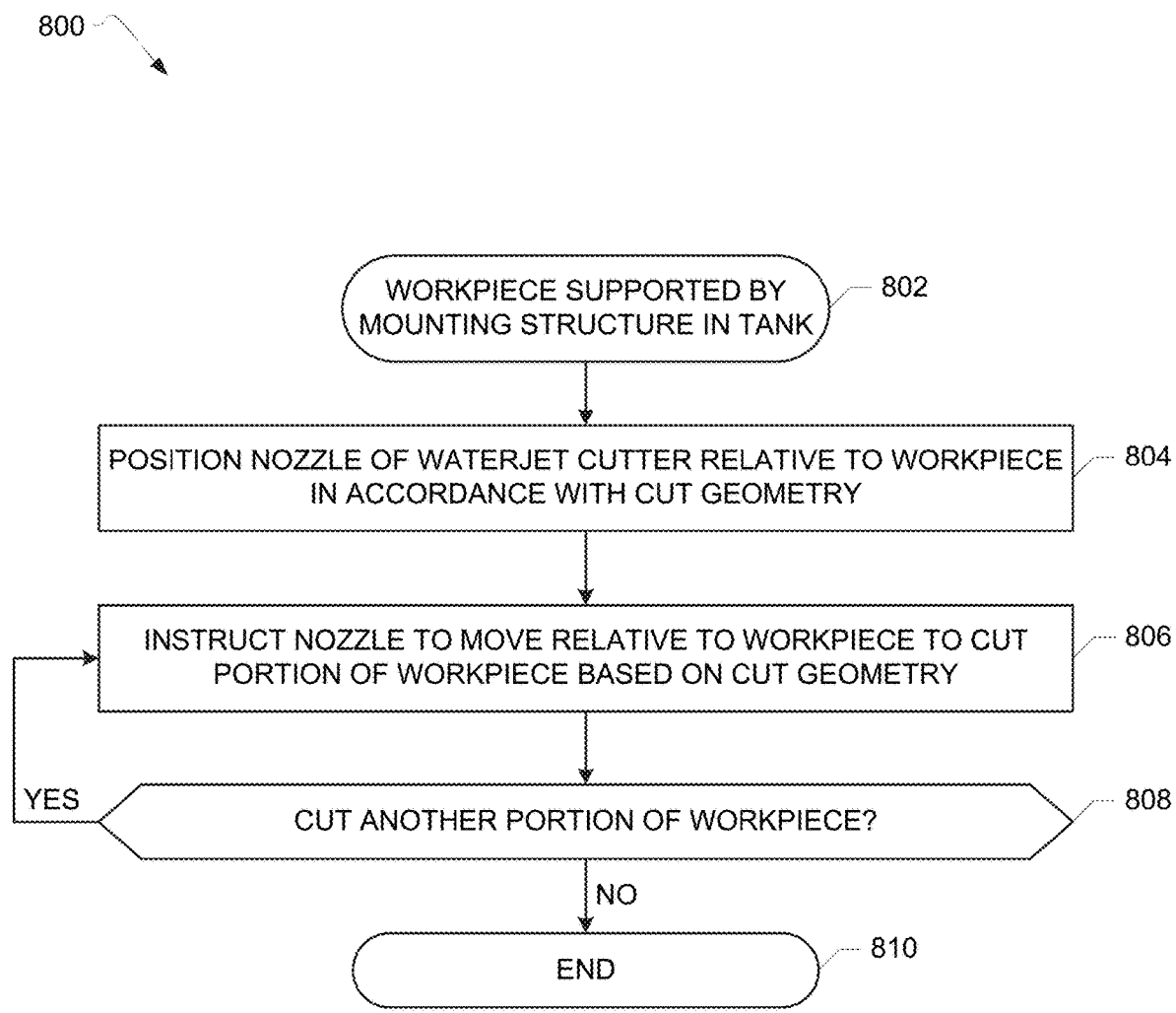
FIG. 8 is a flowchart representative of machine readable instructions that may be executed to implement the example waterjet controller of FIG. 1 to a performing a waterjet cutting process on a workpiece supported by the example mounting structure disclosed herein.

FIG. 8 is a flowchart of an example method 800 that may be implemented by the example waterjet controller 107 of FIG. 1 to perform a waterjet cutting process on a workpiece (e.g., the workpiece 105) supported by the example mounting structure 102. The example method 800 of FIG. 8 begins when the workpiece is supported in the tank 101 by the mounting structure 102 of FIGS. 1-6 (e.g., the workpiece is supported by the fixture(s) 110) (block 802).

In the example of FIG. 8, the waterjet controller 107 positions the nozzle 109 of the waterjet cutter 106 of FIG. 1 relative to a measured location of the workpiece in accordance with a geometry of a cut to be made in the workpiece (block 804). The part can be located in space relative to the waterjet using, for instance a laser tracker and T-probe and/or other methods for locating the part. A transformation function for mapping a coordinate space of the part to a coordinate space of the waterjet is determined. The mapping function (or, in some instances, the results of the mapping) is provided to the waterjet controller to enable the waterjet controller to position the waterjet within the coordinate space of the waterjet such that the waterjet is in a correct location relative to the coordinate space of the part.

The waterjet controller 107 causes the nozzle 109 of the waterjet cutter 106 to move relative the workpiece 105 to cut the workpiece 105 based on the cut geometry (block 806). As disclosed herein, the example mounting structure 102 of FIGS. 1-6 prevents vibrations and/or forces due to, for instance, water turbulence, tank deformation, etc. from being transferred to the workpiece 105 during the waterjet cutting process. For example, the workpiece 105 may be supported by the first fixture 110 and the second fixture 112. As the nozzle 109 of the waterjet cutter 106 moves proximate to the first fixture 110, the first isolation member 500 reduces or substantially eliminates vibrations of the fluid and/or the tank 101 that would otherwise be transferred to the first fixture 110 and, thus, the portion of the workpiece 105 supported by the first fixture 110. As the nozzle 109 of the waterjet cutter 106 moves proximate to the second fixture 112 during cutting of the workpiece 105, the second isolation member 502 to reduce vibrations of the fluid and/or the tank 101 that would otherwise be transferred to the second fixture 112 and the portion of the workpiece 105 supported by the second isolation member 502.

The example method 800 ends when there are no further portion(s) of the workpiece 105 to be cut (blocks 808, 810).

The example waterjet controller 107 of FIG. 1 may be implemented by hardware, software, firmware and/or any combination of hardware, software and/or firmware. Thus, for example, the example waterjet controller 107 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, the example waterjet controller 107 is hereby expressly defined to include a non-transitory computer readable storage device or storage disk such as a memory, a digital versatile disk (DVD), a compact disk (CD), a Blu-ray disk, etc. including the software and/or firmware. Further still, the example waterjet controller 107 may include one or more elements, processes and/or devices in addition to, or instead of, those illustrated in FIG. 1, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

One or more elements of the flowchart of FIG. 8 are representative of example hardware logic, machine readable instructions, hardware implemented state machines, and/or any combination thereof for implementing the waterjet controller 107 of FIG. 1. The machine readable instructions may be one or more executable programs or portion(s) of an executable program for execution by a computer processor and/or processor circuitry, such as the processor 912 shown in the example processor platform 900 discussed below in connection with FIG. 9. The program may be embodied in software stored on a non-transitory computer readable storage medium such as a CD-ROM, a floppy disk, a hard drive, a DVD, a Blu-ray disk, or a memory associated with the processor 912, but the entire program and/or parts thereof could alternatively be executed by a device other than the processor 912 and/or embodied in firmware or dedicated hardware. Further, although the example program is described with reference to the flowchart illustrated in FIG. 8, many other methods of implementing the example waterjet controller 107 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, one or more elements of the example process of FIG. 8 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

Figure 9:
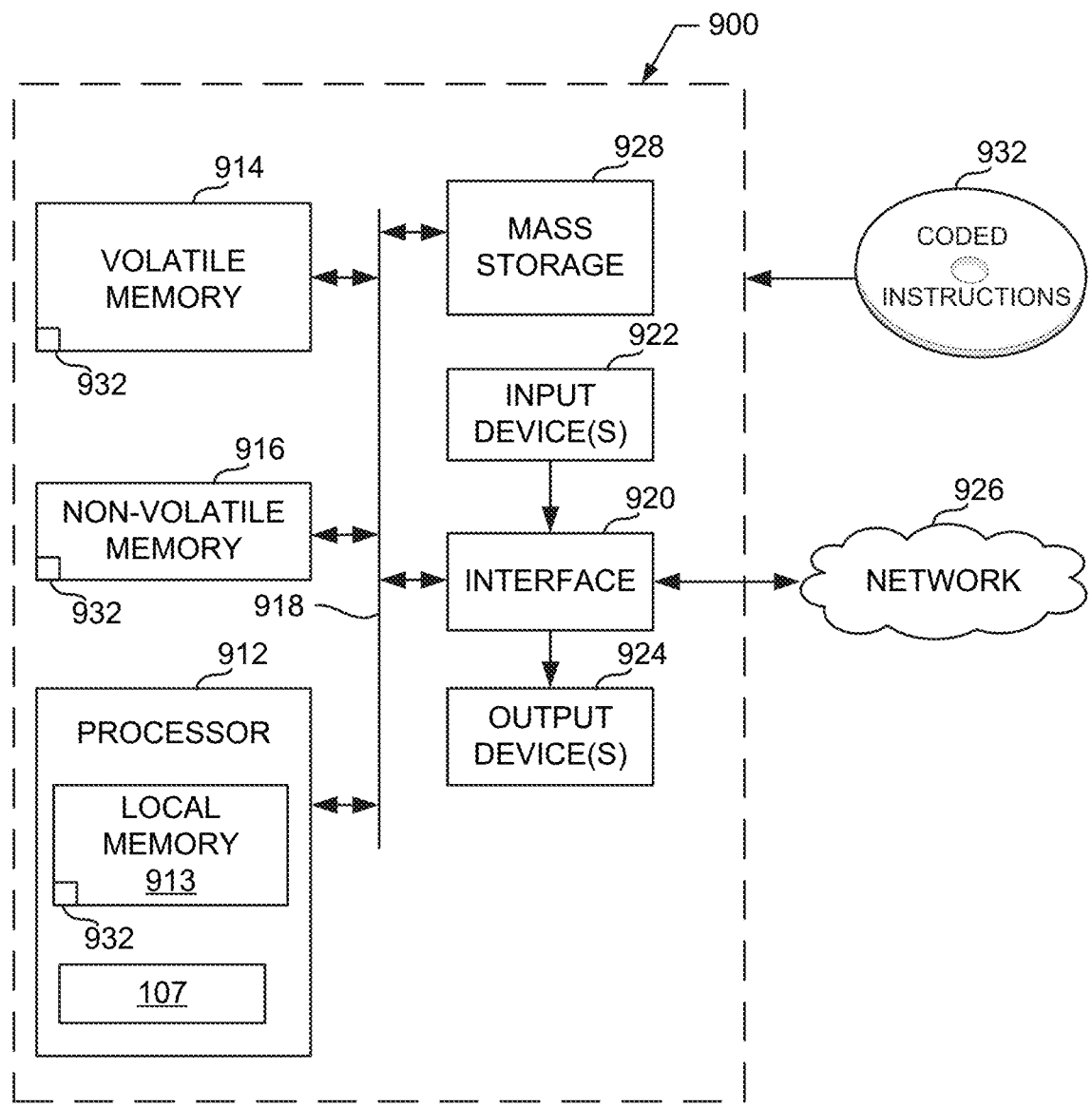
FIG. 9 is a block diagram of an example processing platform structured to execute the instructions of FIG. 8 to implement the example waterjet controller of FIG. 1.

FIG. 9 is a block diagram of an example processor platform 900 structured to execute the instructions of FIG. 8 to implement the waterjet controller 107 of FIG. 1. The processor platform 900 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the waterjet controller 107.

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

Coded instructions 932 of FIG. 9 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus, and articles of manufacture have been disclosed that provide for improved stability of a workpiece during a waterjet cutting process. Example mounting structures disclosed herein enable a workpiece to be supported by a support structure located within a tank but isolate the workpieces from the effects of tank deformation and/or turbulence from fluid in the tank. Example mounting structures disclosed herein include isolation member(s) that surround the fixture(s) that support the workpiece such that a gap is defined between an isolation member and a corresponding fixture. The gap is substantially free from fluid and, as a result, vibrations experienced by the isolation tube due to fluid turbulence are not transferred to the fixture. Further, examples disclosed herein isolate the fixture from deformations of the tank in which the mounting structure is located by coupling components of the mounting structure to a floor on which the tank rests. As a result of the increased stability of the workpiece, the accuracy of the cuts performed on the workpiece is also increased as compared to if the mounting structure was exposed to fluid turbulence during the waterjet cutting process.

Example 1 includes an apparatus including a tank defining a volume to contain a fluid therein; a fixture extending from the tank; and a tube extending from the tank, the tube to isolate the fixture and a part supported by the fixture from turbulence of the fluid disposed in the tank.

Example 2 includes the apparatus of claim 1, wherein the tube is to isolate the fixture and the part from a structural change of the tank due to deformation of at least a portion of the tank.

Example 3 includes the apparatus of claim 1 or 2, wherein a surface of the tank includes apertures defined therein, the apertures extending through the surface of the tank, the fixture is coupled to the tank via first fasteners extending through first ones of the apertures and the tube coupled to the tank via second fasteners extending through second ones of the apertures.

Example 4 includes the apparatus of any of claims 1-3, further including a seal, the seal to prevent the fluid from flowing through third ones of the apertures not including the fasteners for the fixture or the tube.

Example 5 includes the apparatus of any of claims 1-4, wherein the seal includes a plate to extend over two or more of the third ones of the apertures.

Example 6 includes the apparatus of any of claims 1-5, wherein the seal is coupled to the surface via third fasteners extending through the third ones of the apertures.

Example 7 includes the apparatus of any of claims 1-6, wherein the tube surrounds at least a portion of the fixture.

Example 8 includes the apparatus of any claims 1-7, wherein the tube is spaced from the fixture.

Example 9 includes the apparatus of any of claims 1-8, further including at least one bracket to support the tube.

Example 10 includes the apparatus of any of claims 1-9, wherein the fixture has a first height and the tube has a second height, the first height different than the second height.

Example 11 includes the apparatus of claims 1-10, wherein the first height is greater than the second height, at least a portion of the fixture to extend beyond the tube.

Example 12 includes a system including a tank to receive a fluid; a first member to support a part during a waterjet cutting process, the first member coupled to a surface of the tank; and a second member to isolate the first member and the part from fluid turbulence during the waterjet cutting process, the second member disposed in the tank, the part and at least a portion of the first member disposed beyond the second member.

Example 13 includes the system of claim 12, wherein the first member is a tube.

Example 14 includes the system of any of claim 12 or 13, wherein the tube defines a cavity, the first member positioned within the cavity.

Example 15 includes the system of any of claims 12-14, wherein a surface of the tank includes apertures, the first member coupled to the tank via a first set of the apertures.

Example 16 includes the system of any of claims 12-15, wherein the second member is coupled to the tank via a second set of the apertures.

Example 17 includes the system of any of claims 12-16, wherein the first member and the second member define a gap therebetween.

Example 18 includes the system of any of claims 12-17, wherein the gap is to be substantially free of the fluid in the tank.

Example 19 includes the system of any of claims 12-18, further including a controller to control a position of a waterjet cutter relative to the first member.

Example 20 includes a method including positioning, via a controller, a nozzle of a waterjet cutter relative to a part, the part supported by a fixture coupled to a surface of a tank, at least a portion of the fixture surrounded by an isolation tube; and causing, via the controller, the nozzle to move relative to the part to cause at least a portion of the part to be cut, the isolation tube to reduce vibrations of the tank transferred to the fixture and the part during the cutting of the part.

Example 21 includes the method of claim 20, wherein a first portion of the fixture is disposed in a fluid in the tank and a second portion of the fixture is to extend above the fluid, the part supported by the second portion of the fixture.

Example 22 includes the method of claim 20 or 21, wherein the fixture is a first fixture to support a first portion of the part, the isolation tube is a first isolation tube, and the tank includes a second fixture to support a second portion of the part, at least a portion of the second fixture surrounded by a second isolation tube, and further including causing the nozzle to move past the first fixture and the second fixture to cut the part, the second isolation tube to reduce vibrations of the tank transferred to the second fixture and the part during the cutting of the part.

Example 23 includes an apparatus including a first fixture disposed in a tank, the first fixture to support a workpiece; and a first isolation member disposed in the tank, the first isolation member surrounding the first fixture and spaced apart from the first fixture, the first isolation member to isolate the first fixture from fluid in the tank.

Example 24 includes the apparatus of claim 23, further including a second fixture disposed in the tank, the first fixture to support a first portion of the workpiece and the second fixture to support a second portion of the workpiece; and a second isolation member disposed in the tank, the second isolation member surrounding the second fixture and spaced apart from the second fixture.

Example 25 includes the apparatus of claim 23 or 24, wherein the first fixture is removably coupled to a first portion of the tank and the second fixture is removably coupled to a second portion of the tank.

Example 26 includes the apparatus of any of claims 23-25, wherein the first isolation member is coupled to a surface on which the tank rests via fasteners extending through apertures defined in the tank.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   a tank defining a volume to contain a fluid therein;
   a fixture extending from the tank; and
   a tube extending from the tank, the tube to isolate the fixture and a part supported by the fixture from turbulence of the fluid disposed in the tank.

2. The apparatus of claim 1, wherein the tube is to isolate the fixture and the part from a structural change of the tank due to deformation of at least a portion of the tank.

3. The apparatus of claim 1, wherein a surface of the tank includes apertures defined therein, the apertures extending through the surface of the tank, the fixture is coupled to the tank via first fasteners extending through first ones of the apertures and the tube coupled to the tank via second fasteners extending through second ones of the apertures.

4. The apparatus of claim 3, further including a seal, the seal to prevent the fluid from flowing through third ones of the apertures not including the fasteners for the fixture or the tube.

5. The apparatus of claim 4, wherein the seal includes a plate to extend over two or more of the third ones of the apertures.

6. The apparatus of claim 4, wherein the seal is coupled to the surface via third fasteners extending through the third ones of the apertures.

7. The apparatus of claim 1, wherein the tube surrounds at least a portion of the fixture.

8. The apparatus of claim 7, wherein the tube is spaced from the fixture.

9. The apparatus of claim 1, wherein the fixture has a first height and the tube has a second height, the first height different than the second height.

10. The apparatus of claim 9, wherein the first height is greater than the second height, at least a portion of the fixture to extend beyond the tube.

11. A system comprising:
    a tank to receive a fluid;
    means for supporting a part during a waterjet cutting process, the supporting means coupled to a surface of the tank; and
    means for isolating the supporting means and the part from fluid turbulence during the waterjet cutting process, the isolating means disposed in the tank, the part and at least a portion of the supporting means disposed beyond the isolating means.

12. The system of claim 11, wherein the first member isolating means is a tube.

13. The system of claim 12, wherein the tube defines a cavity, the at least a portion of the supporting means positioned within the cavity.

14. The system of claim 11, wherein a surface of the tank includes apertures, the supporting means coupled to the tank via a first set of the apertures.

15. The system of claim 14, wherein the isolating means is coupled to the tank via a second set of the apertures.

16. The system of claim 11, wherein the supporting means and the isolating means define a gap therebetween.

17. The system of claim 16, wherein the gap is to be substantially free of the fluid in the tank.

18. A method comprising:
    positioning, via a controller, a nozzle of a waterjet cutter relative to a part, the part supported by a fixture coupled to a surface of a tank, the tank defining a volume to contain a fluid therein, the fixture extending from the tank, at least a portion of the fixture surrounded by an isolation tube, the isolation tube extending from the tank; and
    causing, via the controller, the nozzle to move relative to the part to cause at least a portion of the part to be cut, the isolation tube to reduce vibrations of the tank transferred to the fixture and the part during the cutting of the part.

19. The method of claim 18, wherein a first portion of the fixture is disposed in a fluid in the tank and a second portion of the fixture is to extend above the fluid, the part supported by the second portion of the fixture.

20. The method of claim 18, wherein the fixture is a first fixture to support a first portion of the part, the isolation tube is a first isolation tube, and the tank includes a second fixture to support a second portion of the part, at least a portion of the second fixture surrounded by a second isolation tube, and further including causing the nozzle to move past the first fixture and the second fixture to cut the part, the second isolation tube to reduce vibrations of the tank transferred to the second fixture and the part during the cutting of the part.

* * * * *

UNITED STATES PATENT AND TRADEMARK OFFICE
CERTIFICATE OF CORRECTION

PATENT NO.         : 12,240,080 B2
APPLICATION NO.    : 17/373216
DATED              : March 4, 2025
INVENTOR(S)        : Jensen Page 1 of 1

It is certified that error appears in the above-identified patent and that said Letters Patent is hereby corrected as shown below:

In the Claims

Column 15, Claim 4, Line 26, Delete "the fasteners" and Insert --the first or second fasteners--.

Column 16, Claim 12, Line 6, Delete "first member".

Column 16, Claim 13, Line 9, Delete "a" and Insert --the--.

Column 16, Claim 14, Line 11, Delete "a" and Insert --the--.

Column 16, Claim 19, Line 36, Delete "a" and Insert --the--.

Signed and Sealed this
Seventh Day of October, 2025

John A. Squires
*Director of the United States Patent and Trademark Office*